(12) United States Patent  (10) Patent No.: US 9,475,656 B2
Sieksmeier et al.  (45) Date of Patent: Oct. 25, 2016

(54) ACTUABLE SWITCH FOR INFLUENCING A FLOW OF PIECES OF GOODS IN A CONVEYOR SYSTEM, CONVEYOR SYSTEM COMPRISING AN ACTUABLE SWITCH OF THIS TYPE, AND METHOD FOR OPERATING AN ACTUABLE SWITCH OF THIS TYPE

(71) Applicant: Dürkopp Fördertechnik GmbH, Bielefeld (DE)

(72) Inventors: Dirk Sieksmeier, Spenge (DE); Michael Wend, Bielefeld (DE)

(73) Assignee: DÜRKOPP FÖRDERTECHNIK GMBH, Bielefeld (DE)

( * ) Notice: Subject to any disclaimer, the term of this patent is extended or adjusted under 35 U.S.C. 154(b) by 0 days.

(21) Appl. No.: 14/625,733

(22) Filed: Feb. 19, 2015

(65) Prior Publication Data

US 2015/0232284 A1 Aug. 20, 2015

(30) Foreign Application Priority Data

Feb. 20, 2014 (DE) .......................... 10 2014 203 118

(51) Int. Cl.
*B65G 11/20* (2006.01)
*B65G 47/64* (2006.01)
*B65G 47/76* (2006.01)

(52) U.S. Cl.
CPC .................................. *B65G 47/766* (2013.01)

(58) Field of Classification Search
CPC ...... B65G 11/20; B65G 47/64; B65G 47/82; B07C 1/00
USPC ............ 198/358, 349, 437, 464.1; 209/657; 193/35 G, 31 A
See application file for complete search history.

(56) References Cited

U.S. PATENT DOCUMENTS 3,938,647 A * 2/1976 Raque .................. B65G 17/005
198/437
5,067,857 A * 11/1991 Ward ..................... B65G 51/24
193/31 A (Continued)

FOREIGN PATENT DOCUMENTS

DE 9408513 U1 9/1995
DE 20214780 U1 9/2003

(Continued)

OTHER PUBLICATIONS

European Search report dated Jun. 24, 2015, in corresponding European application EP15153760.

*Primary Examiner* — Douglas Hess
(74) *Attorney, Agent, or Firm* — Browdy and Neimark, PLLC

(57) ABSTRACT

An actuable switch for influencing a flow of pieces of goods in a conveyor system comprises a feed track for feeding the pieces of goods, a first discharge track for discharging the pieces of goods in a first discharge direction, a second discharge track for discharging the pieces of goods in a second discharge direction different from the first discharge direction, a switch blade which is actuable for displacement between a first operating position and a second operating position, wherein in the first operating position, the pieces of goods are delivered from the feed track to the first discharge track, and wherein in the second operating position, the pieces of goods are delivered from the feed track to the second discharge track, and an actuating member for applying an actuating force to the switch blade for a force-controlled displacement of the switch blade between the first operating position and the second operating position.

14 Claims, 3 Drawing Sheets

(56) References Cited

U.S. PATENT DOCUMENTS

| | | | | |
|---|---|---|---|---|
| 5,388,682 A * | 2/1995 | Dudley | B65G 47/766 | 198/367 |
| 5,423,409 A * | 6/1995 | Wipf | B65B 23/12 | 198/367 |
| 5,518,102 A * | 5/1996 | Hershline | B65G 47/766 | 193/31 R |
| 5,730,270 A * | 3/1998 | Malow | B65G 47/766 | 193/31 A |
| 5,768,998 A | 6/1998 | Enderlein et al. | | |
| 6,131,720 A * | 10/2000 | Heuft | B65G 47/766 | 198/367 |
| 6,220,427 B1 * | 4/2001 | Ratz | B65G 47/642 | 198/369.5 |
| 6,981,581 B2 * | 1/2006 | Salvoni | B65G 47/766 | 198/370.07 |
| 7,600,643 B2 * | 10/2009 | Georgitsis | B07C 5/36 | 209/552 |
| 2005/0121292 A1 | 6/2005 | Braunmuller | | |
| 2008/0237097 A1 | 10/2008 | Kolbe et al. | | |
| 2011/0233027 A1 | 9/2011 | Kolbe et al. | | |

FOREIGN PATENT DOCUMENTS

| | | |
|---|---|---|
| DE | 10352782 A1 | 6/2005 |
| EP | 1974895 A2 | 10/2008 |

* cited by examiner

ACTUABLE SWITCH FOR INFLUENCING A FLOW OF PIECES OF GOODS IN A CONVEYOR SYSTEM, CONVEYOR SYSTEM COMPRISING AN ACTUABLE SWITCH OF THIS TYPE, AND METHOD FOR OPERATING AN ACTUABLE SWITCH OF THIS TYPE

CROSS-REFERENCE TO RELATED APPLICATIONS

This application claims the priority of German Patent Application Serial No. DE 10 2014 203 118.4 filed on 20 Feb. 2014, pursuant to 35 U.S.C. 119(a)-(d), the content of which is incorporated herein by reference as if fully set forth herein.

FIELD OF THE APPLICATION

The invention relates to an actuable switch for influencing a flow of pieces of goods in a conveyor system, a conveyor system comprising an actuable switch of this type, and a method for operating an actuable switch of this type.

BACKGROUND OF THE INVENTION

A switch for an overhead suspension conveyor for receiving hanging goods is known from DE 202 14 780 U1. The switch is operated manually by turning a switch blade. Since a manual intervention is necessary to operate the switch blade, the delivery rate of a conveyor system comprising a switch of this type is reduced.

Furthermore actuable switches are known which are operable in an automated manner. To ensure a trouble-free flow of the pieces of goods, a large distance between two adjacent pieces of goods is required in the direction of conveyance of a conveyor system comprising a switch of this type. Due to this large distance, the delivery rate of a conveyor system of this type is reduced.

SUMMARY OF THE INVENTION

An object of the present invention is to provide a conveyor system which ensures an increased delivery rate for pieces of goods.

This object is achieved by an actuable switch for influencing a flow of pieces of goods in a conveyor system, the actuable switch comprising a feed track for feeding the pieces of goods; a first discharge track for discharging the pieces of goods along a first discharge direction; a second discharge track for discharging the pieces of goods along a second discharge direction different from the first discharge direction; a switch blade which is actuable for displacement between a first operating position and a second operating position, wherein in the first operating position, the pieces of goods are conveyed from the feed track to the first discharge track; and in the second operating position, the pieces of goods are conveyed from the feed track to the second discharge track; and an actuating member for applying an actuating force to the switch blade for a force-controlled displacement of the switch blade between the first operating position and the second operating position. According to the invention it was recognized that the actuable switch for influencing a flow of pieces of goods in a conveyor system allows the delivery rate to be increased by reducing a distance in a direction of conveyance between two adjacent pieces of goods such that a trouble-free delivery of the pieces of goods is guaranteed. This is achieved in that an actuating force for a displacement of a switch blade between a first operating position and a second operating position different therefrom is selected such that the switch blade does not interfere with the flow of the pieces of goods. It is in particular excluded that the transport of the piece of goods in the direction of conveyance is interrupted or terminated due to a contact between the actuated switch blade and a piece of goods transported in the region of the switch blade. The direction of the actuating force applied to the switch blade is oriented transversely to the direction of conveyance of the pieces of goods. The direction of conveyance of the piece of goods, to which the actuating force is applied by means of the switch blade, remains substantially unchanged. This means that the switch blade may in particular be operated for a piece of goods even if a previous piece of goods arranged upstream thereof in the direction of conveyance is still arranged in the region of the switch blade. It is therefore in particular not necessary to select a distance between two adjacent pieces of goods in the direction of conveyance such that a piece of goods cannot be conveyed into the region of the switch blade until the previous piece of goods arranged upstream thereof has been moved away from the switch blade. In other words, it is not necessary to adjust the distance between two adjacent pieces of goods such as to correspond to at least the length of the delivery path between one feed track and a first discharge track or a second discharge track. The actuable switch according to the invention allows the required minimum distance between two adjacent pieces of goods in the direction of conveyance to be reduced. In other words, it is intended that when the switch according to the invention is actuated, the switch blade is still in contact with the previous piece of goods arranged in the region of the switch blade. The switch blade is in contact with the previous piece of goods in particular when being displaced from the first into the second operating position. The actuated displacement of the switch blade is interrupted, in particular temporarily, when the switch blade comes to abut against the previous piece of goods. The switch blade follows the movement of the piece of goods until the switch blade is in a predetermined end position.

In an advantageous embodiment of the actuable switch, the actuating force is defined such that an effective actuating force component applied to the piece of goods by the switch blade is smaller than or equal to a guide/drive force used to convey the piece of goods in a first discharge direction or in a second discharge direction. The guide/drive force is required for guiding and/or driving the piece of goods. The guide/drive force may for instance be the result of a frictional force acting between a piece of flat packed goods, in particular an individual unit such as a package, and a conveyor belt on which said individual unit is arranged. The guide/drive force may also be defined by an adapter receiving for instance a clothes hanger carrying a piece of clothing, the adapter being conveyed along a rail system.

In an advantageous embodiment of the actuable switch, a required minimum distance between two adjacent pieces of goods is smaller than a switch delivery path. The switch delivery path is a distance between the inlet into the switch blade region, i.e. the inlet into the switch blade region, and the discharge from the switch blade region.

In an advantageous embodiment of the actuable switch, the switch blade is configured as a pivot lever pivotable about a pivot axis. The pivot axis is in particular oriented vertically. A switch blade of this type has a simple and rugged design. A switch blade of this type is in particular suitable for influencing the flow of goods conveyed on a conveyor belt in the form of individual units.

Another object of the present invention is to improve a conveyor system for conveying pieces of goods such that the delivery rate thereof is increased.

This object is achieved by a conveyor system for conveying pieces of goods, comprising an actuable switch according to the invention; a supply track for supplying the pieces of goods to the feed track; a first outlet track for moving the pieces of goods away from the first discharge track; and a second outlet track for moving the pieces of goods away from the second discharge track. The conveyor system is provided with an actuable switch according to the invention. The advantages of the conveyor system according to the invention correspond to the advantages of the actuable switch to which reference is made.

In an advantageous embodiment of the conveyor system, an actuating member for actuating the switch blade is in signal communication with a control unit. The control unit is in particular used to trigger a switching process, in other words to actuate a change of the switch blade position, in particular in an automated manner.

In an advantageous embodiment of the conveyor system, the conveyor system comprises at least one identification unit for identifying the pieces of goods. The identification unit is a reading unit which is able to detect an identification code of the piece of goods. For instance, the identification code may in particular be a barcode. A two-dimensional barcode, a so called QR code, may also be used to identify the pieces of goods. If the pieces of goods are flat packed goods, the identification code may be attached directly to the piece of goods. If the pieces of goods are hanging goods, the identification code may be attached to an adapter for receiving a clothes hanger carrying the piece of goods. The adapter and/or the flat packed goods may in particular be directly provided with a transponder. The identification unit is selected depending on the type of the identification code, and is thus for instance configured as a barcode reader or a transponder reader.

In a particularly advantageous embodiment of the conveyor system, the identification unit is in signal communication with the control unit for transmitting an identification signal. The function of the identification signal is to trigger the controlled change of the switch blade position. To this end, a list may be stored in the control system which includes delivery routes through the conveyor system, wherein different delivery routes are defined for each individual piece of goods. A particular switch blade position may then be selected depending on the respective identification code. As an alternative or in addition thereto, it is for instance conceivable as well to operate the switch blade after a particular number of goods. When it is desired to pick pieces of goods to be packaged in defined lots of for instance 50 items, it is for instance conceivable to detect the number of the conveyed pieces of goods by means of the identification unit. The identification unit is in this case also a counting unit. As soon as the required number of pieces of goods along a first delivery route is reached, the switch blade is actuated by means of the control device to ensure that the following pieces of goods are compiled via the second delivery route.

Another object of the present invention is to improve a method for actuating an actuable switch such as to increase the delivery rate of a conveyor system.

This object is achieved by a method for operating an actuable switch for influencing a flow of pieces of goods in a conveyor system, the method comprising the steps of supplying the pieces of goods to the switch via a supply track; feeding the pieces of goods into the switch via a feed track; operating the switch blade, which is actuable for displacement, so as to move to a first operating position in which the pieces of goods are conveyed to a first discharge track in a first discharge direction, or to a second operating position in which the pieces of goods are conveyed to a second discharge track in a second discharge direction different from the first discharge direction; and applying an actuating force to the switch blade by means of an actuating member for a force-controlled displacement of the switch blade between the first operating position and the second operating position. The essential feature is that when an actuating force is applied to a switch blade which is actuable for displacement, the switch blade is displaceable between two operating positions. Switching between the switch blade positions is performed such that the switch blade ensures a trouble-free delivery of the pieces of goods even though the actuating force is applied thereto. This means that it is possible to change the switch blade position even if a previous piece of goods is still arranged in the region of the switch blade since the delivery of said previous piece of goods is not interfered with when the switch blade is actuated. This allows a distance between two pieces of goods conveyed in a direction of conveyance to be reduced. The method according to the invention increases the delivery rate of the pieces of goods in the conveyor system.

In an advantageous embodiment of the method, the pieces of goods are conveyed such that a minimum delivery distance required between two adjacent pieces of goods is smaller than a switch delivery path. As a result, the delivery rate is increased even more.

In an advantageous embodiment of the method, the pieces of goods are actively driven in the direction of conveyance. To this end, a conveyor drive is required. A conveyor drive may for instance be configured as a driven conveyor belt for flat packed goods or as a driven conveyor system for adapters receiving hanging goods by means of a clothes hanger.

The features described in the patent claims and the features described in the following exemplary embodiment of the conveyor system according to the invention are suitable, whether individually or in combination with each other, to further develop the subject matter according to the invention. The respective combinations of features do not limit the subject matter of the invention in terms of its further development and shall only be regarded as examples.

Further features, advantages and details of the invention will be apparent from the following description of an exemplary embodiment with reference to the drawing.

DESCRIPTION OF THE PREFERRED EMBODIMENT

Figure 1:
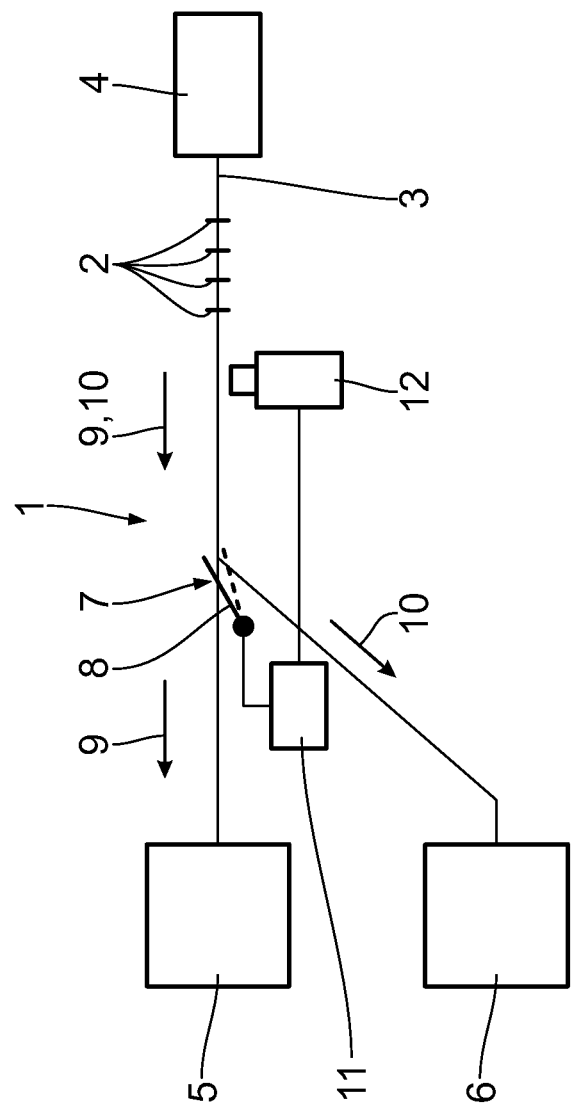
FIG. 1 shows a schematic view of a conveyor system according to the invention comprising a switch.

A conveyor system 1 shown in a highly schematic view in FIG. 1 is used to convey, in other words deliver, pieces of goods 2. The pieces of goods 2 are conveyed along a predefined conveyor track 3. The conveyor tracks 3 can be configured differently from each other, depending on the pieces of goods 2 to be delivered. Driven conveyor belts are for instance used to transport flat packed goods. Driven transport rail systems are used to convey adapters for receiving hanging goods, in particular clothes hangers carrying pieces of clothing.

The pieces of goods 2 are conveyed along the conveyor track 3 from a source of goods, configured as a warehouse 4 according to the illustrated exemplary embodiment, to at least two different destinations. In the illustrated embodiment, a first destination is a first order picking station 5, and a second destination is a second order picking station 6. The order picking stations 5, 6 are used to pick several goods required for an order which in particular comprises more than one piece of goods. The picked goods may then for instance be delivered from the order picking stations 5, 6 to an outgoing goods department. It is conceivable as well to directly convey the pieces of goods 2 from the warehouse 4 to the outgoing goods department via the conveyor track 3. In this case, the order picking stations 5, 6 can be omitted so that the goods are directly moved to their destination, in other words the outgoing goods department. It is conceivable as well to provide more than one outgoing goods department.

An actuable switch 7 is provided to influence the flow of the pieces of goods 2 along the conveyor track 3. The switch 7 is substantially in the shape of a Y and is required to distribute the pieces of goods 2 from the warehouse 4 to the first or second destination 5, 6. To this end, the switch 7 has a switch blade 8 shown schematically in FIG. 1 which is actuable for displacement between a first operating position shown by a dashed line in FIG. 1 and a second operating position shown by a continuous line in FIG. 1. In the first operating position, the switch 7 allows the pieces of goods 2 to be delivered from the warehouse 4 to the first destination 5. The pieces of goods 2 are discharged from the switch 7 in a first discharge direction. The first discharge direction corresponds to a first direction of conveyance 9. In the second operating position, the pieces of goods 2 are correspondingly discharged from the switch 7 in a second discharge direction. The second discharge direction corresponds to a second direction of conveyance 10. The first direction of conveyance 9 and the second direction of conveyance 10 are identical in the region of the conveyor track 3 between the warehouse 4 and the switch 7. At the switch 7, the directions of conveyance 9, 10 diverge from each other to follow the respective discharge direction. In order to actuate the switch blade 8 of the switch 7, the switch blade 8 is in signal communication with a control unit 11. The control unit 11 is in signal communication with an identification unit 12. The identification unit 12 is used to identify the pieces of goods 2.

Figure 2:
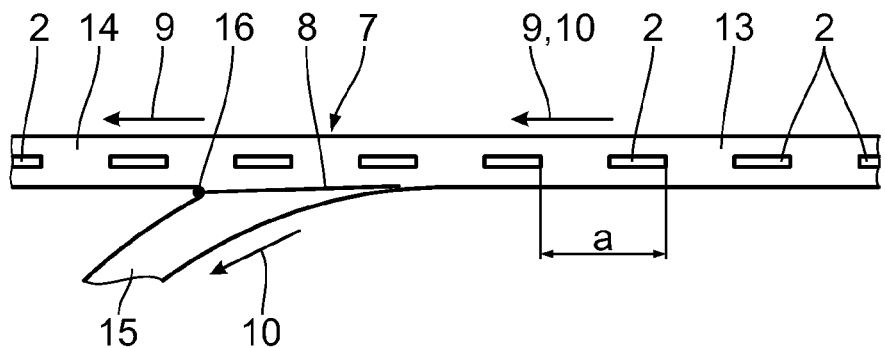
FIG. 2 shows a schematic plan view of a switch according to FIG. 1, a switch blade being in a first operating position.

In the following sections, the design and function of the actuable switch 7 will be explained in more detail by means of FIGS. 2 to 8. FIG. 2 shows an enlarged detailed view of the switch 7.

The actuable switch 7 comprises a feed track 13 facing the warehouse 4. The feed track 13 may in particular be part of the conveyor track 3. Along the feed track 13, the pieces of goods 2 are conveyed to the switch 7 in the direction of conveyance 9, 10. The switch 7 further comprises a first discharge track 14 to discharge the pieces of goods 2 in the first discharge direction 9. The switch 7 further comprises a second discharge track 15 to discharge the pieces of goods 2 in the second discharge direction 10. In the region between the switch 7 and the destinations 5, 6, the discharge directions 9, 10—and therefore the directions of conveyance 9, 10—are different from each other.

In the region between the warehouse 4 and the switch 7, the conveyor track 3 is referred to as supply track. The supply track is used to deliver the pieces of goods 2 to the feed track 13. Correspondingly, the first discharge track 14 is adjoined by a first outlet track along which the pieces of goods 2 are moved out in the first direction of conveyance 9 while the second discharge track 14 is adjoined by a second outlet track along which the pieces of goods 2 are moved out in the second direction of conveyance 10.

According to the schematic illustration in FIG. 2, the switch blade 8 is in a first operating position. In said first operating position, the switch blade 8 opens the path, via the feed track 13, from the warehouse 4 to the first discharge track 14, and therefore to the first destination 5, in the first direction of conveyance 9. The second discharge track 15, in other words the delivery from the warehouse 4 to the second destination 6, is at the same time interrupted. In the first operating position of the switch blade 8, the pieces of goods 2 are conveyed from the feed track 13 to the first discharge track 14. Conveying the pieces of goods 2 from the feed track 13 to the second discharge track 15 is not possible in the first operating position of the switch blade 8 according to FIG. 2 since the switch blade 8 blocks the second discharge track 15.

An actuating member 16 is provided to displace the switch blade 8 between the operating positions. In the illustrated exemplary embodiment, the actuating member 16 is configured as a vertical axis to which the switch blade 8 is mounted in the manner of a sail, in other words the switch blade 8 is pivotable about the vertical axis. The actuating member 16 is in signal communication with the control unit (not shown) via a data connection. The actuating member 16 applies an actuating force $F_S$ to the switch blade 8 to displace the switch blade 8 from the first operating position shown in FIG. 2 into the second operating position shown in FIG. 6. In the illustrated embodiment, the actuating force $F_S$ is in this case applied to the vertical axis of the actuating member 16 in a counterclockwise direction. In other words, the switch blade 8 is rotated upwardly about the actuating member 16 in the counterclockwise direction. The rotating movement in the counterclockwise direction for displacing the switch blade 8 from the first operating position into the second operating position is designated by reference numeral 17 in FIG. 3.

Figure 6:
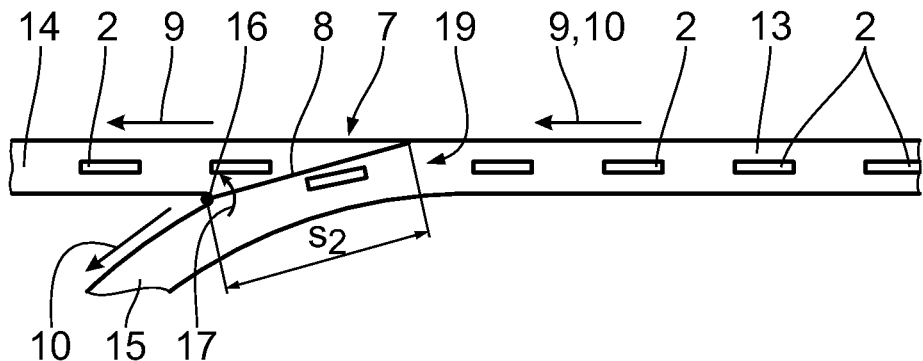
Figure 7:
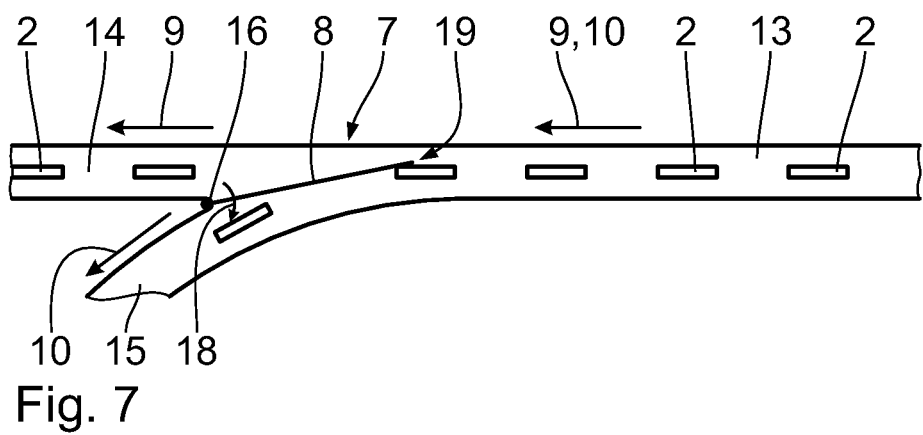
Figure 8:
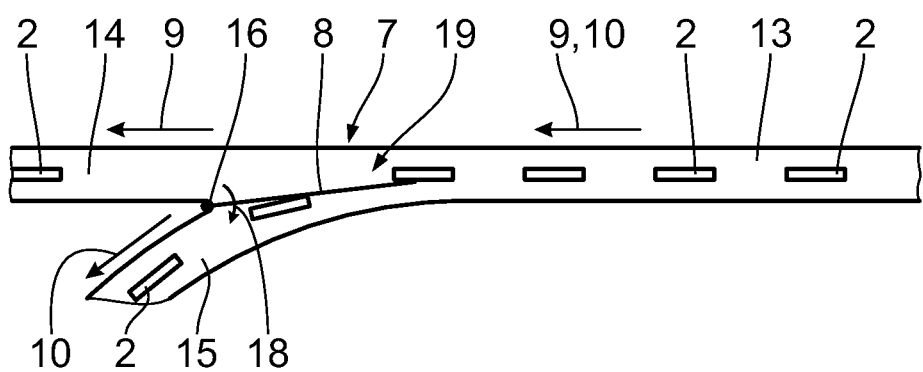

Correspondingly, the switch blade 8 is displaced from the second operating position shown in FIG. 6 back into the first operating position when the switch blade 8 is rotated about the actuating member 16 in the clockwise direction. This means that the actuating force $F_S$ for displacing the switch blade 8 from the second operating position into the first operating position is opposite to the actuating force $F_S$ for displacing the switch blade 8 from the first operating position into the second operating position. This rotational movement is designated by reference numeral 18 in FIGS. 7 and 8.

In the following sections, the functioning of the actuable switch 7 and in particular the method for operating the actuable switch 7 will be explained in more detail by means of FIGS. 2 to 8. Starting from the arrangement of the conveyor system 1 shown in FIG. 2 with the switch blade 8 of the switch 7 being in the first operating position, the pieces of goods are moved into the switch 7 via the feed track 13.

In order to actuate the switch blade 8, an actuating signal is released. When the switch blade 8 is operated, the actuating member 16 applies the force $F_S$ to the switch blade 8. When the actuating force $F_S$ is applied to the switch blade 8, the switch blade 8 is rotated in the clockwise direction 17. When this happens, the switch blade 8 may come into contact with a piece of goods 2 disposed in the switch region 19 at this particular time. The switch region 19 is the region arranged between the feed track 13 and the two discharge tracks 14, 15.

Figure 3:
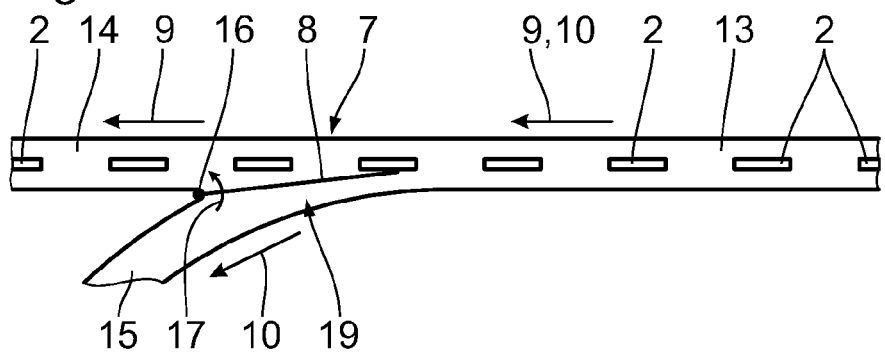
FIGS. 3 to 8 show corresponding plan view with the switch blade being in different operating positions.

Said first contact between the switch blade 8 and the piece of goods 2 is shown in FIG. 3. In this configuration, a continuing rotation of the switch blade 8 in the clockwise direction 17 is prevented. This is due to the fact that the actuating force $F_S$, which is transverse to the directions of conveyance 9, 10, is selected such as to ensure a trouble-free delivery of the pieces of goods 2. In other words, the absolute value of the actuating force $F_S$ is selected such that an effective actuating force component $F_{S,eff}$ applied to piece of goods 2 by the switch blade 8 is smaller than or equal to a guide/drive force $F_F$. The guide/drive force $F_F$ is required to deliver the piece of goods along one of the discharge directions or one of the directions of conveyance 9, 10. In other words, the switch blade 8 is pressed against the piece of goods 2 with the actuating force $F_S$. The actuating force 2 is however small enough to prevent the piece of goods 2 from shifting along the conveyor track or to ensure a trouble-free transport of an adapter for hanging goods while the switch blade 8 is being pressed against the piece of goods 2. When the piece of goods 2 is continued to be conveyed in the first direction of conveyance 9, the pivotable switch blade 8 moves in the counterclockwise direction 17 until the switch blade 8 has reached the second operating position illustrated in FIG. 6. In this second operating position, the first direction of conveyance 9 is blocked by the switch blade 8. Via the feed track 13, the pieces of goods 2 are delivered to the switch 7 where they move along the switch blade 8 towards the second discharge track 15.

If it is desired to move the switch blade 8 back into the first operating position, an actuating signal is released by the control unit 11. The switch blade 8 is then displaced in the clockwise direction 18 until the switch blade 8 comes to abut against the piece of goods 2. Correspondingly, when the switch blade 8 is moved from the second operating position back into the first operating position, the switch blade 8 follows the movement of the piece of goods 2 until it has reached the desired, in this case the first, operating position.

In other words, the conveyor system according to the invention comprising the switch according to the invention allows the switch blade 8 to be moved from a first operating position into a second operating position and back even if pieces of goods 2 to be conveyed are disposed in the region of the switch, and in particular in the region of the switch blade 8, at the same time. The delivery of pieces of goods is not interrupted even if the switch blade 8 is in contact with a piece of goods 2 arranged on the conveyor track 3. The switch blade 8 is in particular displaced by means of a force applied thereto.

Figure 4:
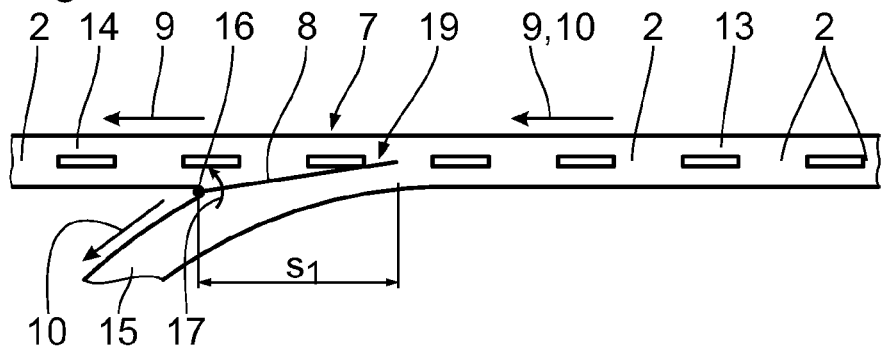
Figure 5:
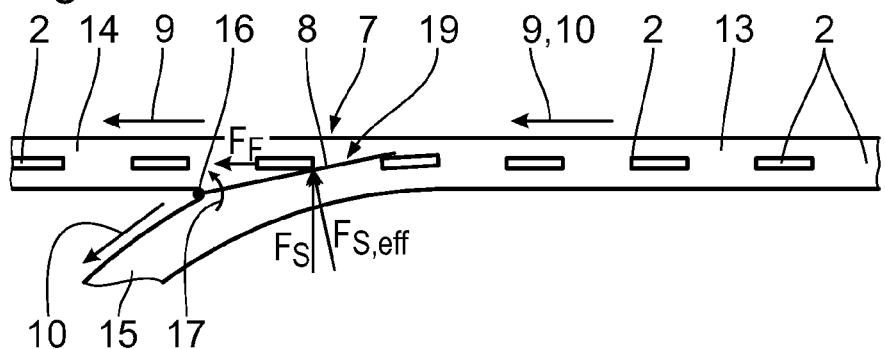

As a result, the switch according to the invention allows a distance a provided between two adjacent pieces of goods 2 to be reduced. This increases the density of the pieces of goods 2 in the conveyor system 1, thus resulting in an increased delivery rate. In particular, a required minimum distance $a_{min}$ between two adjacent pieces of goods is smaller than a switch delivery path s. The switch delivery path s corresponds to the delivery path in the respective discharge direction. The switch delivery path $s_1$ in the first discharge direction is shown in FIG. 4 while the switch delivery path $s_2$ in the second discharge direction is shown in FIG. 6. The switch delivery path $s_1$, $s_2$ substantially corresponds to the projection of the switch blade 8 to the respective discharge track 14 or 15, respectively.

What is claimed is:

1. An actuable switch for influencing a flow of pieces of goods (2) in a conveyor system (1), the actuable switch (7) comprising
   a. a feed track (13) for feeding the pieces of goods (2);
   b. a first discharge track (14) for discharging the pieces of goods (2) along a first discharge direction (9);
   c. a second discharge track (15) for discharging the pieces of goods (2) along a second discharge direction (10) different from the first discharge direction (9);
   d. a switch blade (8) which is actuable for displacement between a first operating position and a second operating position, wherein
      i. in the first operating position, the pieces of goods (2) are conveyed from the feed track (13) to the first discharge track (14); and
      ii. in the second operating position, the pieces of goods (2) are conveyed from the feed track (13) to the second discharge track (15); and
   e. an actuating member (16) for applying an actuating force (Fs) to the switch blade (8) for a force-controlled displacement of the switch blade between the first operating position and the second operating position such that a direction of conveyance of the pieces of goods, to which the actuating force is applied by the switch blade, remains substantially unchanged.

2. An actuable switch according to claim 1, wherein the actuating force ($F_s$) is selected such that an effective actuating force component ($F_{s,eff}$) applied to a piece of goods (2) by the switch blade (8) is one of smaller than and equal to a guide/drive force ($F_F$) required to convey the piece of goods (2) along one of the first discharge direction (9) and the second discharge direction (10).

3. An actuable switch according to claim 1, wherein a minimum delivery distance ($a_{min}$) required between two adjacent pieces of goods (2) is smaller than a switch delivery path (s).

4. An actuable switch according to claim 1, wherein the switch blade (8) is configured as a pivot lever pivotable about a pivot axis.

5. An actuable switch according to claim 4, wherein the pivot axis is vertical.

6. A conveyor system for conveying pieces of goods (2), comprising
   a. an actuable switch (7) according to claim 1;
   b. a supply track for supplying the pieces of goods (2) to the feed track (13);
   c. a first outlet track for moving the pieces of goods (2) away from the first discharge track (14);
   d. a second outlet track for moving the pieces of goods (2) away from the second discharge track (15).

7. A conveyor system according to claim 6, comprising a control unit (11) which is in signal communication with the actuating member (16) to actuate a displacement of the switch blade position.

8. A conveyor system according to claim 6, comprising at least one identification unit (12) for identifying the pieces of goods (2).

9. A conveyor system according to claim 8, wherein in order to transmit an identification signal, the identification unit (12) is in signal communication with the control unit (11) such that the identification signal triggers the controlled displacement of the switch blade position.

10. A method for operating an actuable switch (7) for influencing a flow of pieces of goods (2) in a conveyor system (1), the method comprising the steps of supplying the pieces of goods (2) to the switch (7) via a supply track;

feeding the pieces of goods (2) into the switch (7) via a feed track (13);

operating the switch blade (8), which is actuable for displacement, so as to move to one of a first operating position in which the pieces of goods (2) are conveyed to a first discharge track (14) in a first discharge direction (9), and a second operating position in which the pieces of goods (2) are conveyed to a second discharge track (15) in a second discharge direction (10) different from the first discharge direction (9);

applying an actuating force ($F_s$) to the switch blade (8) by an actuating member (16) for a force-controlled displacement of the switch blade (8) between the first operating position and the second operating position such that a direction of conveyance of the pieces of goods, to which the actuating force is applied by the switch blade, remains substantially unchanged.

11. A method according to claim 10, comprising a delivery of the pieces of goods (2) such that a minimum delivery distance ($a_{min}$) between two adjacent pieces of goods (2) is smaller than a switch delivery path (s).

12. A method according to claim 10, comprising an active delivery of the pieces of goods (2) along one of the directions of conveyance (9, 10).

13. A method according to claim 12, wherein the active delivery of the pieces of goods (2) is a driven delivery by means of a conveyor drive.

14. An actuable switch for influencing a flow of pieces of goods (2) in a conveyor system (1), the actuable switch (7) comprising a. a feed track (13) for feeding the pieces of goods (2);
b. a first discharge track (14) for discharging the pieces of goods (2) along a first discharge direction (9);
c. a second discharge track (15) for discharging the pieces of goods (2) along a second discharge direction (10) different from the first discharge direction (9);
d. a switch blade (8) which is actuable for displacement between a first operating position and a second operating position, wherein
   i. in the first operating position, the pieces of goods (2) are conveyed from the feed track (13) to the first discharge track (14); and
   ii. in the second operating position, the pieces of goods (2) are conveyed from the feed track (13) to the second discharge track (15); and
e. an actuating member (16) for applying an actuating force ($F_s$) to the switch blade (8) for a force-controlled displacement of the switch blade between the first operating position and the second operating position such that a direction of conveyance of the pieces of goods, to which the actuating force is applied by the switch blade remains substantially unchanged,
f. a switch region (19) being arranged between the feed track (13) and said discharge tracks (14, 15),
g. a control unit (11) being in a signal communication with said switch blade (8) for actuating said switch blade (8), wherein in dependence of an actuating signal actuation of the switch blade (8) is initiated such that the switch blade (8) comes into contact with the piece of goods (2) disposed in the switch region (19), and wherein in this configuration, continuing rotation of the switch blade (8) is prevented.

\* \* \* \* \*